United States Patent [19]
Asoh

[11] Patent Number: 5,742,764
[45] Date of Patent: Apr. 21, 1998

[54] COMMUNICATION SYSTEM

[75] Inventor: Hiroshi Asoh, Tokyo, Japan

[73] Assignee: NEC Corporation, Japan

[21] Appl. No.: 607,436

[22] Filed: Feb. 27, 1996

[51] Int. Cl.$^6$ .......................... G06F 15/16; G06F 15/40; G06F 13/00
[52] U.S. Cl. ............ 395/200.3; 370/468; 370/335; 370/337; 340/825.07; 340/825.14; 215/610; 215/611
[58] Field of Search ............... 395/200.3, 611; 364/284, 282.1; 340/825.07, 825.14, 825.44, 825.52; 370/468, 335, 337

[56] References Cited

U.S. PATENT DOCUMENTS

| | | | |
|---|---|---|---|
| 4,389,644 | 6/1983 | Abito et al. | 340/825.52 |
| 4,872,006 | 10/1989 | Takao | 340/825.52 |
| 5,296,851 | 3/1994 | Ikuta et al. | 340/825.07 |
| 5,359,375 | 10/1994 | Clark | 354/131 |
| 5,450,071 | 9/1995 | DeLuca et al. | 340/825.44 |
| 5,533,095 | 7/1996 | Kikuchi | 379/57 |
| 5,598,416 | 1/1997 | Yamada et al. | 370/468 |

Primary Examiner—Emanuel T. Voeltz
Assistant Examiner—Hien Vo
Attorney, Agent, or Firm—Ostrolenk, Faber, Gerb & Soffen, LLP

[57] ABSTRACT

A communication system has a transmission system and a reception system for receiving data and a transmitter-side operations message file from the transmission system. The transmission system has a transmitter-side data base, an inputting device for inputting an operation message signal for a data operation of registration, deletion or change to the transmitter-side data base, a controller for controlling transmitter-side data base processing that carries out the data operation based on the operation message signal, and a device for generating and transmitting an operation message file that receives the operation message signal from the operation message inputting device and then generates the transmitter-side operation message file to send it to the reception system. The reception system has a receiver-side data base, a converter for converting an operation message that receives the transmitter-side operation message file and converts it into a receiver-side operation message file, and a controller for controlling receiver-side data base processing that carries out a data operation of registration, deletion or change to the receiver-side data base based on the receiver-side operation message file from the operation message converter.

4 Claims, 5 Drawing Sheets

FIG.2
PRIOR ART

| DATA NAME | DATA |
|---|---|
| a a a a a a a a | 1 2 3 4 |
| b b b b b b b b | 5 6 7 8 |
| c c c c c c c c | 9 0 1 2 |
| d d d d d d d d | 3 4 5 6 |
| ⋮ | ⋮ |
| z z z z z z z z | 9 9 9 9 |

FIG.6

| NUMBER | OPERATIONS | DATA NAME | DATA |
|---|---|---|---|
| 0 0 0 1 | REGISTRATION | a a a a a a a a | 1 2 3 4 |
| 0 0 0 2 | REGISTRATION | b b b b b b b b | 5 6 7 8 |
| 0 0 0 3 | CHANGE | c c c c c c c c | 9 0 1 2 |
| 0 0 0 4 | CHANGE | d d d d d d d d | 3 4 5 6 |
| 0 0 0 5 | DELETION | b b b b b b b b | — |

COMMUNICATION SYSTEM

FIELD OF THE INVENTION

This invention relates to a communication system, and more particularly to, a communication system for matching data bases between plural systems.

BACKGROUND OF THE INVENTION

In a conventional communication system, when data in a data base is moved between systems, a part of the data base information is transferred as a file. Then, the other reception system cancels the data before receiving the file and re-registers the received file in its data base.

In the conventional communication system, when data is exchanged between systems, data to be matched is arranged between a transmission system A and a reception system B. For example, in the conventional communication system, the order (the position of address etc.) of data to be exchanged in the data base is coincided with each other and data is exchanged in a lump. This is because the exchanged data can not be used in the other system B when the order of data is different between each data base.

However, in the conventional communication system, even when the data base is particularly changed, all the pertinent data has to be transferred in the form of a file. Furthermore, the reception system must renew or re-register all the pertinent data including data unnecessary to be renewed. Therefore, in a system that the partial change of a data base is mainly conducted, it takes an unnecessary processing time for matching between the systems. Moreover, in the conventional communication system, when the matching of a data base composition, a management manner version etc. is not arranged, the transferred file can not be received in the other data base.

SUMMARY OF THE INVENTION

Accordingly, it is an object of the invention to provide a communication system in which processing time for matching between plural data base is minimized.

It is a further object of the invention to provide a communication system in which the matching of data base management manners between plural systems is unnecessary.

According to the invention, a communication system comprises a transmission system and a reception system for receiving data and transmitter-side operation message file from the transmission system, wherein:

the transmission system comprises a transmitter-side data base, means for inputting an operation message signal for a data operation of registration, deletion or change to the transmitter-side data base, means for controlling transmitter-side data base processing that carries out the data operation based on the operation message signal, and means for generating and transmitting an operation message file that receives the operation message signal from the operation message inputting means and then generates the transmitter-side operation message file to send it to the reception system; and the reception system comprises a receiver-side data base, means for converting an operation message that receives the transmitter-side operation message file and converts it into a receiver-side operation message file, means for controlling receiver-side data base processing that carries out a data operation of registration, deletion or change to the receiver-side data base based on the receiver-side operation message file from the operation message converting means.

BRIEF DESCRIPTION OF THE DRAWINGS

The invention will be explained in more detail in conjunction with the appended drawings, wherein:

FIG. 2 shows a data-file format used in the conventional communication system,

FIG. 6 shows a data base operation file used in the above embodiment.

DESCRIPTION OF THE PREFERRED EMBODIMENTS

Before explaining a communication system in the preferred embodiment, the aforementioned conventional communication system will be explained in FIG. 1.

Figure 1:
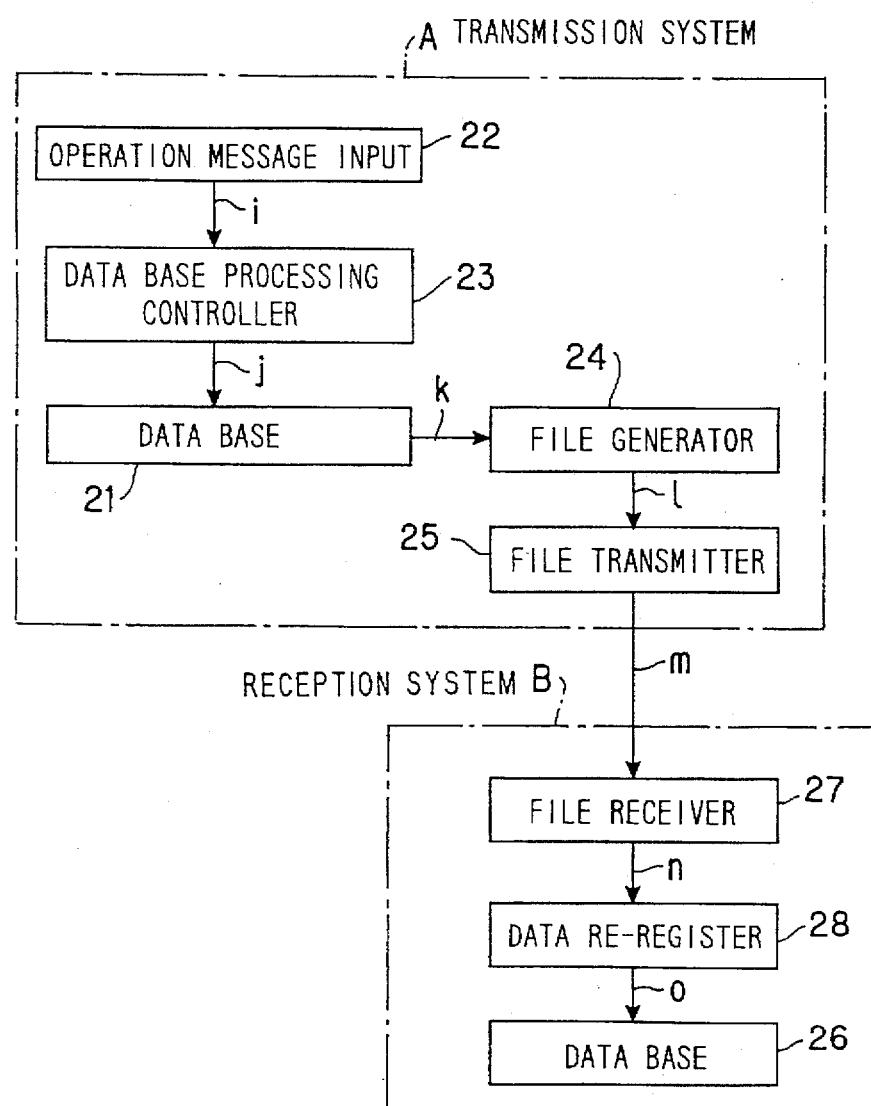
FIG. 1 is a block diagram showing a conventional communication system.

FIG. 1 is a block diagram showing a conventional communication system. As shown in FIG. 1, the conventional communication system comprises a transmission system A, and a reception system B which receives data and a transmitter-side operation message file from the transmission system A.

The transmission system A comprises a transmitter-side data base 21, an operation message signal input 22 to which an operation message signal for a data operation of registration, deletion or change to the data base 21 is input, a transmitter-side data base processing controller 23 which generates a data base processing signal j based on an operation message signal i from the operation message signal input 22 and outputs it to the transmitter-side data base 21 to conduct the data operation, a file generator 24 which receives data k from the transmitter-side data base processing controller 23 and then generates a data file 1, and a file transmitter 25 which receives the data file 1 from the file generator 24 and then outputs a transmitter-side operation message file m to the reception system B.

In operation, when an operator operates the operation message signal input 22, the operation message signal i from the operation message signal input 22 is input to the transmitter-side data base processing controller 23. The data base processing controller 23 generates the data base processing signal j based on the operation message signal i to control the transmitter-side data base 21. Namely, the transmitter-side data base processing controller 23 carries out the data operation of registration, deletion or change to the transmitter-side data base 21 based on the operation message signal i.

The file generator 24 reads out data k from the transmitter-side data base 21 while matching between both the systems and generates the data file 1 according to a format, for example, as shown in FIG. 2, to output it to the file transmitter 25. The file transmitter 25 sends the data file 1 as the transmitter-side operation message file m to the reception system B.

The reception system B comprises a receiver-side data base 26, a file receiver 27 and a data re-register 28. The file receiver 27 receives the transmitter-side operation message file m from the file transmitter 25 and sends it as a receiver-side message file n to the data re-register 28. The data re-register 28 generates a receiver-side data base processing control signal o based on the receiver-side message file n and carries out the re-registration to the receiver-side data base 26.

Figure 3:
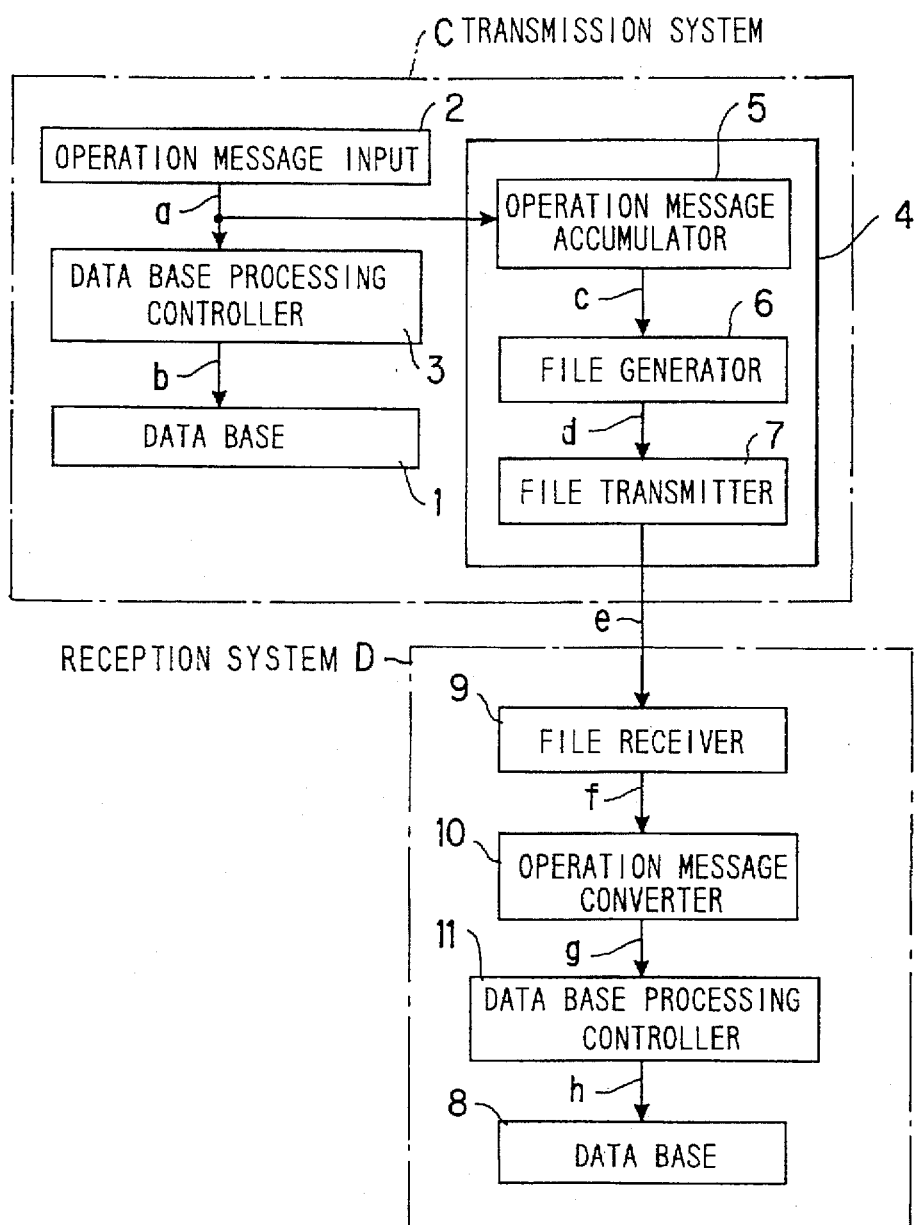
FIG. 3 is a block diagram showing a communication system in a preferred embodiment according to the invention.

Next, a communication system in the preferred embodiment will be explained in FIG. 3. As shown in FIG. 3, the communication system comprises a transmission system C and a reception system D for receiving data and an operation message file from the transmission system C.

The transmission system C comprises a transmitter-side data base 1, an operation message signal input 2 to which an operation message signal for a data operation of registration, deletion or alteration to the data base 1 is input, a transmitter-side data base processing controller 3 which controls the data operation based on an operation message signal a from the operation message signal input 2, and an operation message file generating and transmitting unit 4 which generates a transmitter-side operation message file c by processing the operation message signal a from the operation message input 2 and sends it to the reception system D.

Herein, the operation message file generating and transmitting unit 4 comprises an operation message accumulator 5 in which the operation message signal a from the operation message input 2 is received and accumulated, a file generator 6 which generates a transmitter-side operation message file e by receiving an operation message signal c from the operation message accumulator 5, and a file transmitter 7 which sends the transmitter-side operation message file e from the file generator 6 to the reception system D.

Figure 4:
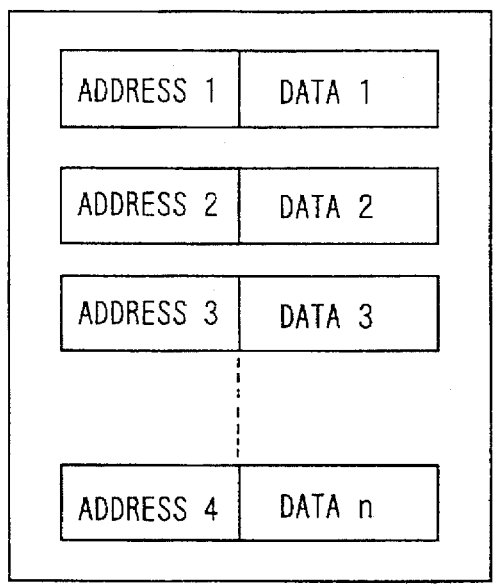
FIG. 4 shows a data base at a transmission system C in the above embodiment.

The reception system D comprises a receiver side data base 8, a file receiver 9 which outputs an operation message file f by receiving the transmitter-side operation message e, an operation message converter 10 which receives the operation message file f from the file receiver 9 and converts it to a receiver-side operation message file g, and a receiver-side data base processing controller 11 which generates a data base processing control signal h based on the receiver-side operation message file g from the operation message converter 10 and sends it to the receiver-side data base 8 to carry out the data operation of registration, deletion or alteration. FIG. 4 shows an operation message file for processing the data bases in the transmission system C and reception system D.

From the operation message signal input 2 in the transmission system C, the operation message a including a data name, data and operation contents (registration, deletion, alteration) is input to the transmitter-side data base processing controller 3. The data base processing controller 3 carries out the processing of the corresponding data in the transmitter-side data base 1 according to the content of the operation message signal a. Also, the operation message signal a is accumulated in the operation message accumulator 5 in the order of the carrying out at the data base processing controller 3. From the operation message accumulator 5, the operation message signal c is read out and is input to the file generator 6. The file generator 6 generates the operation message file d according to a format, for example, as shown in FIG. 6 and the transmitter side 7 to the reception D.

In the reception system D, the file receiver 9 receives the transmitter-side operation message file e and then generates the reception file f to output it to the operation message converter 10. The operation message converter 10 converts the reception file f from the file receiver 9 into the receiver-side operation message signal g. The receiver-side data base processing controller 11 outputs the receiver-side data base processing control signal h to the data base 8 and carries out the data operation of registration, deletion or alteration.

Figure 5:
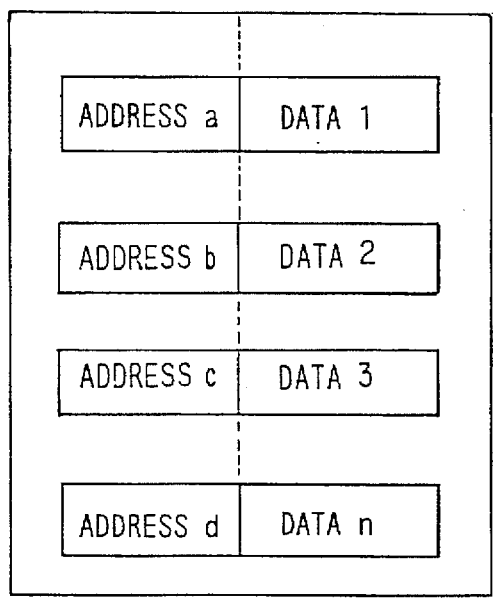
FIG. 5 shows a data base at a reception system D in the above embodiment.

In a communication system according to the invention, an example of the data base in the system C is shown in FIG. 4 and an example of the data base in the system D is shown in FIG. 5. When data 1 is deleted, a message for deleting the data name "xxxxxxxx" in data 1 is transferred from the system C to the system D as the operation message file in FIG. 6. Then, in the system D, the data name "xxxxxxxx" is searched to delete data 1.

On the other hand, when data n is registered, the operation message including data name "yyyyyyyy" and data "abcd" to the data n is transferred from the system C to the system D. Thereby, the data n is registered in the system D. When data m is altered, the operation message including data name "zzzzzzzz" and data "efgh" to the data m is transferred to change the data m into the data "efgh" in the system D. Furthermore, when a complex operation (registration, deletion and change of plural data) to the data base in the transmission system C is carried out, an operation message signal including the complex operation is transferred to carry out the complex operation in the reception system D.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A communication system having a transmission system and a reception system for receiving data and a transmitter-side operation message file from said transmission system, comprising:

said transmission system including a transmitter-side data base, means for inputting an operation message signal for a data operation of registration, deletion or change to said transmitter-side data base, means for controlling transmitter-side data base processing that carries out said data operation based on said operation message signal, and means for generating and transmitting an operation message file that receives said operation message signal from said operation message inputting means and then generates said transmitter-side operation message file to send it to said reception system; and said reception system including a receiver-side data base, means for converting an operation message that receives said transmitter-side operation message file and converts it into a receiver-side operation message file, means for controlling receiver-side data base processing that carries out a data operation of registration, deletion or change to said receiver-side data base based on said receiver-side operation message file from said operation message converting means.

2. A communication system having a transmission system and a reception system for receiving data and a transmitter-side operation message file from said transmission system, comprising:

said transmission system including a transmitter-side data base, means for inputting an operation message signal for a data operation of registration, deletion or change to said transmitter-side data base, means for controlling transmitter-side data base processing that carries out said data operation based on said operation message signal, and means for generating and transmitting an operation message file that receives said operation message signal from said operation message inputting means and then generates said transmitter-side operation message file to send it to said reception system; and said reception system including a receiver-side data base, means for converting an operation message that receives said transmitter-side operation message file and converts it into a receiver-side operation message file, means for controlling receiver-side data base processing that carries out a data operation of registration, deletion or change to said receiver-side data base based on said receiver-side operation message file from said operation message converting means;

said operation message file generating and transmitting means including an operation message accumulator that receives and accumulates said operation message signal from said operation message signal inputting means, a file generator that receives said operation message signal from said operation message accumulator and generates said transmitter-side operation message file, and a file transmitter for transmitting said transmitter-side operation message file from said file generator to said reception system.

3. A communication system having a transmission system and a reception system for receiving data and a transmitter-side operation message file from said transmission system, comprising:

said transmission system including a transmitter-side data base, an operation message input device inputting an operation message signal for a data operation of registration, deletion or change to said transmitter-side data base, a transmitter-side data base processing controller controlling transmitter-side data base processing that carries out said data operation based on said operation message signal, and a device generating and transmitting an operation message file that receives said operation message signal from said operation message input device and then generates said transmitter-side operation message file to send it to said reception system; and said reception system including a receiver-side data base, an operation message converter for converting an operation message that receives said transmitter-side operation message file and converts it into a receiver-side operation message file, a receiver-side operation base processing that carries out a data operation of registration, deletion or change to said receiver-side data base based on said receiver-side operation message file from said operation message converter.

4. A communication system having a transmission system and a reception system for receiving data and a transmitter-side operation message file from said transmission system, comprising:

said transmission system including a transmitter-side data base, an operation message input device for inputting an operation message signal for a data operation of registration, deletion or change to said transmitter-side data base, a transmitter-side data base processing controller controlling transmitter-side data base processing that carries out said data operation based on said operation message signal, and a device generating and transmitting an operation message file that receives said operation message signal from said operation message input device and then generates said transmitter-side operation message file to send it to said reception system; and said reception system including a receiver-side data base, an operation message converter converting an operation message that receives said transmitter-side operation message file and converts it into a receiver-side operation message file, a receiver-side data base processing controller controlling receiver-side operation base processing that carries out a data operation of registration, deletion or change to said receiver-side data base based on said receiver-side operation message file from said operation message converter means;

said device generating and transmitting an operation message file including an operation message accumulator that receives and accumulates said operation message signal from said operation message signal input device, a file generator that receives said operation message signal from said operation message accumulator and generates said transmitter-side operation message file, and a file transmitter for transmitting said transmitter-side operation message file from said file generator to said reception system.

* * * * *

UNITED STATES PATENT AND TRADEMARK OFFICE
CERTIFICATE OF CORRECTION

PATENT NO. : 5,742,764
DATED : April 21, 1998
INVENTOR(S) : HIROSHI, Asoh

It is certified that error appears in the above-indentified patent and that said Letters Patent is hereby corrected as shown below:

```
On the title page, after "[22] Filed: Feb. 27, 1996",
insert --[30]  Foreign Application Priority Data
          Feb. 27, 1995 [JP] Japan .......... 7-38130--.
```

Signed and Sealed this

Seventeenth Day of November, 1998

Attest:

BRUCE LEHMAN

Attesting Officer

Commissioner of Patents and Trademarks